March 11, 1958 I. H. PAGE 2,826,745

GRID-TYPE LIQUID DELAY LINE

Filed Aug. 5, 1946 2 Sheets-Sheet 1

INVENTOR.
IRVING H. PAGE

BY M. A. Hayes

ATTORNEY

INVENTOR.
IRVING H. PAGE
BY M. O. Hayes
ATTORNEY 2,826,745
Patented Mar. 11, 1958

2,826,745

GRID-TYPE LIQUID DELAY LINE

Irving H. Page, Washington, D. C.

Application August 5, 1946, Serial No. 688,413
4 Claims. (Cl. 333—30)
(Granted under Title 35, U. S. Code (1952), sec. 266)

This invention relates to electrical transmission lines, and more particularly to delay type transmission lines.

There are many instances in which electrical delay type transmission lines are required. For example, certain radio object locating systems designed to distinguish moving targets from fixed targets utilize delay type transmission lines to permit comparison of consecutive target pulses. Since echo pulses are returned from both fixed and moving objects, certain moving objects may be lost in or obscured by ground clutter and echoes returned from stationary objects. In object locating systems designed to obviate this difficulty, fixed objects are manifested by video pulses having a constant amplitude, whereas moving objects are manifested by video pulses having a cyclical variation in amplitude. With fixed objects represented by constant amplitude video pulses, there is no difference in amplitude between successive echo pulses; however, there is a difference in amplitude between successive video pulses representing moving objects. Thus, by comparing any two successive video pulses with a view toward determining the difference in amplitude between them, a residual pulse is obtained for moving objects but not for fixed objects. In one such system, the comparison of pulses is achieved in a fixed object canceller which consists of a network adapted to obtain a residual signal proportional to the difference in amplitude between two pulses applied simultaneously thereto. By applying this residual signal to a suitable indicator, such as a cathode ray tube, it is evident that moving objects only will be shown thereon. In order to compare any two successive pulses, however, it is necessary to store or to delay the first video pulse for a period of time equal to the interval between the two pulses. In practice, this interval is equal to the predetermined interval between successive exploratory pulses.

One means of providing the required delay is by the use of a delay type transmission line. Such a line may consist of a transmitting medium confined between two piezoelectric crystals. The signal to be delayed is applied to one of the crystals (the transmitting crystal) causing it to oscillate in accordance with the well-known piezoelectric phenomenon. The mechanical oscillations produced are transferred to the transmitting medium as a compressional wave, which travels through the transmitting medium to the other (receiving) crystal, where it stresses the said receiving crystal to induce an electric charge thereon. The signal induced on the receiving crystal is of the same general character as the original signal applied to the transmitting crystal, but is delayed for a period of time equal to the time required for the compressional wave to travel through the transmitting medium. Since the delayed pulse will not coincide with the succeeding undelayed pulse unless the interval between successive exploratory pulses is precisely the same as the interval provided by the delay line, means are usually provided whereby the interval between successive exploratory pulses is predetermined by the delay line.

While heretofore such delay lines as described have been widely employed, their use has been limited in general to object locating system intended for detecting moving objects at relatively short distances. Where objects at long distances were to be detected the necessary delay required has exceeded the maximum feasible delay obtainable from a delay line of reasonable size. This will be readily apparent when it is considered that the delay is directly proportional to the length of the path over which the compressional wave must travel.

An object of the present invention is to provide a new and improved delay type transmission line, and more particularly a delay type transmission line capable of providing a very long delay as compared with the size of the device required.

Other objects and advantages of the present invention will be apparent from the following detailed description taken in conjunction with the drawings, wherein.

Figure 1:
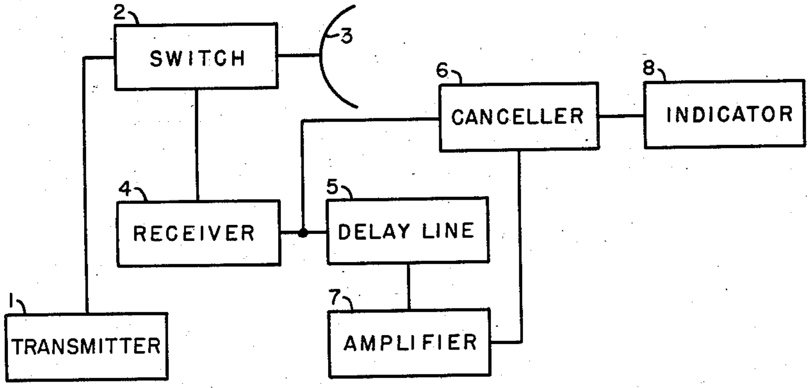
Fig. 1 is a schematic diagram illustrative of a radio-object locating system employing a delay type transmission line.

Referring now to Fig. 1, it will be seen that in this typical object locating system a transmitter 1 is provided which is connected through suitable means to a transmit-receive switch 2, and thereby to a suitable directional radiating device 3, such as a parabolic antenna. Transmit-receive switch 2 serves to connect the transmitter 1 to the antenna 3 during pulse transmission, but during the interval between exploratory pulses, the transmit-receive switch 2 disconnects the transmitter 1 from the antenna and conects the antenna to a receiver 4 to permit reception of echo pulses. The output of the receiver 4 is applied to a delay line 5 and simultaneously to a fixed object canceller which may be connected to the delay line 5 through an amplifier 7, so that the alternation resultant from the pulses passing through the delay line may be compensated. Pulses from a given object may thus be reversed in polarity in passing through the delay line 5 but be of the same amplitude as the pulse applied directly to the fixed object canceller from the receiver. The output of the fixed object canceller 6 is applied to an indicator 8, such as a cathode ray tube. As successive pulses from fixed objects have a constant amplitude, these pulses cancel in the fixed object canceller 6 and no residual output is obtained therefrom. Successive echoes from moving objects on the other hand, vary in amplitude and hence by comparing a delayed pulse with an undelayed pulse in fixed object canceller 6, a residual output is obtained which is then applied to indicator 8 to provide an indication of moving objects.

It will be apparent from the foregoing that it is essential that the pulse to be delayed pass through the delay line without distortion and preferably with minimum attenuation. The delay also must be constant. In accordance with the present invention, a delay line has been provided which, while meeting these requirements, also enables a very long delay without requiring the use of an unduly large delay line.

Figure 2:
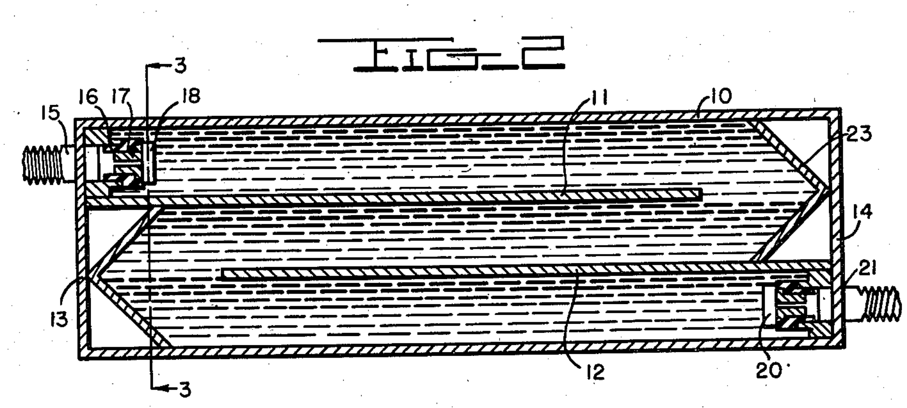
Fig. 2 is a plan, section of a delay type transmission line constructed in accordance with one embodiment of this invention.
Figure 3:
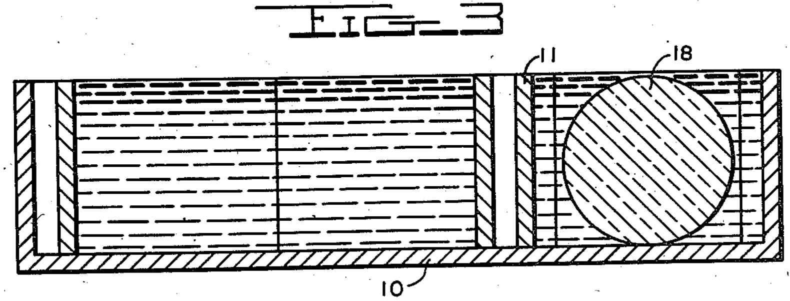
Fig. 3 is an enlarged, transverse, sectional view taken substantially along the line 3—3 of Fig. 2.

Referring now to Figs. 2 and 3 in which one embodiment of this invention is illustrated, it will be seen that a liquid delay line is there shown comprising an elongated, rectangular tank 10, which is preferably made of steel, or other material having high dimensional stability. Two similar, spaced, parallel walls 11 and 12, respectively, are disposed within the tank, and the left end of the wall 11 is in contact with the left end wall 13 of the tank 10 while the right end of the wall 11 is spaced from the opposite end wall 14 of the tank 11. Conversely, the wall 12 has its right end attached to the end wall 14 of the tank 11 while its left end is spaced from the end wall 13 of the tank.

The tank 10 is thus divided into three parallel, rectangular cross-section channels of equal width, length and depth. In the upper left end wall 13 of the tank 10, as viewed in Fig. 2, is mounted a coaxial cable fitting 15, the fitting extending transversely through the wall of the tank and having secured to its inner end an insulating sleeve 16 and a substantially cylindrical contact member 17 which is connected to the central conductor of the coaxial fitting. A piezoelectric crystal 18 is suitably secured to the circular end of the crystal holder assembly, as by cementing, and may have a circular disc shape as more clearly shown in Fig. 3. The crystal 18 is the input or transmitting crystal. A receiving or output crystal 20 of similar characteristics to the crystal 18 is secured to a crystal holder, designated generally at 21, substantially identical to the crystal holder for the crystal 18, and mounted in the lower right portion of the end wall 14 of the tank 10, as viewed in Fig. 2. The tank 10 is filled with a transmitting medium 22 which provides suitable band width and hence good signal fidelity. It has been found that the acoustic impedance (product of the velocity of sound through the medium and the density of the medium) of the transmitting medium should be substantially equal or matched to the acoustic impedance of the crystals and that mercury satisfies this requirement.

From the foregoing it will be apparent that a compressional wave produced by vibration of the crystal 18 will travel to the right, as viewed in Fig. 2, through the mercury. In order to reflect this wave back and along the central channel of the tank 10, to a right angle, corner reflector 23 is provided and, as shown in Fig. 2, is so mounted in the tank 2 that its apex touches the end wall 14 while its sides extend respectively to the wall 10 and the wall 12, the axis of the reflector being aligned with the intermediate wall 11. A similar reflector 24 is mounted at the opposite end of the tank 13 between the wall 11 and the lower sidewall of the tank 10, as viewed in Fig. 2, and has its apex touching the end wall 13, the axis of the reflector being aligned with the axis of the intermediate wall 12. Thus, a compressional wave originating at the crystal 18 is caused to travel to the right until it strikes the reflector 23, is then reflected to the left until it strikes the reflector 24 and finally reflected again to the right until it reaches the crystal 20 producing a charge thereon as a result of the piezoelectric effect. The signal induced on the receiving crystal 20 is of the same general character as the original signal applied to the transmitting crystal 18, but is delayed for a period of time proportional to the time taken for the compressional wave to travel through the transmitting medium. It has been found that the delay line shown in Figs. 2 and 3 involves no sacrifice in fidelity and that the attenuation is no greater than would be incurred in using a straight, that is, a non-reflecting, delay line having an equivalent length. On the other hand, the delay line may be made substantially more compact than the straight type delay line and it will be readily apparent that additional channels may be added as required. The rectangular channels are not only easier to fabricate but also have less tendency to produce in the reflected waves elliptical polarization, such as occurs with tubular channels. It has been found in practice that it is desirable to employ odd numbers of channels in order to keep the crystals apart, that is, to avoid mounting the crystals in the same end plate. In use a suitable cover plate (not shown) would, of course, be employed to prevent loss of mercury.

Figure 4:
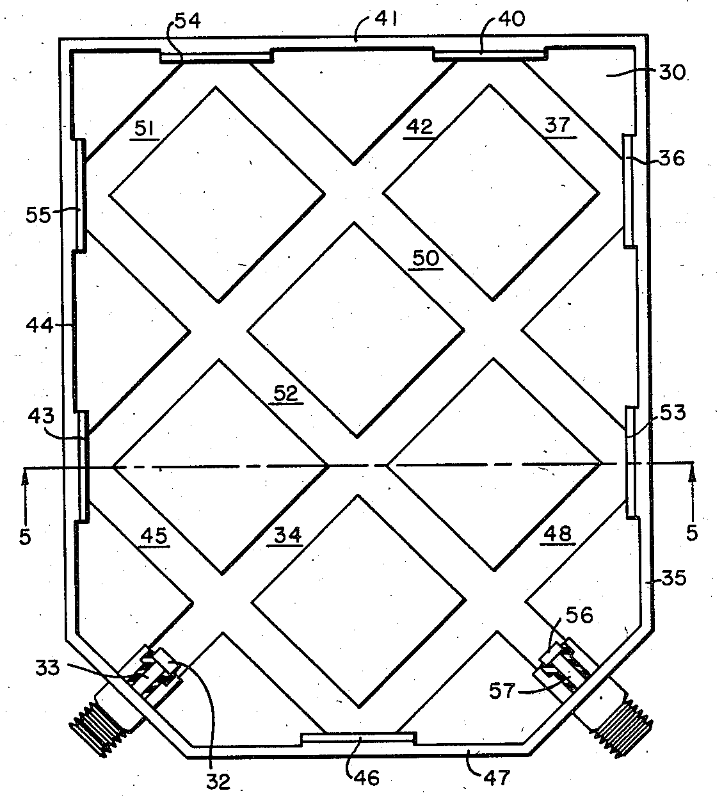
Fig. 4 is a plan, section of a delay type transmission line constructed in accordance with a second embodiment of this invention.
Figure 5:
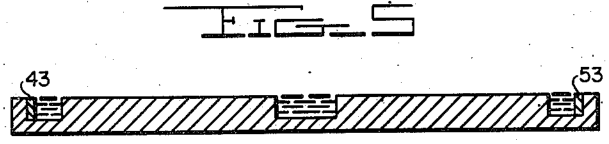
Fig. 5 is a transverse, sectional view taken substantially along the line 5—5 of Fig. 4.

Referring now to Figs. 4 and 5, it will be seen that a somewhat more complex type of delay line is there illustrated. This delay line, however, provides a substantially longer delay in the same space and at the same time eliminates transverse modes of vibration thus providing a higher fidelity output without requiring that the channels be precisely held to a certain size. In accordance with this embodiment of the present invention, a heavy rectangular block 30, which is formed of a material having high dimensional stability such as steel, is milled out to provide a plurality of generally diagonal, rectangular cross section, and thus channels crossing at right angles, forming in effect a grid. Thus, a signal applied to a transmitting medium 31 filling the channels forming the grid from a piezoelectric crystal 32 mounted in a suitable coaxial fitting designated generally at 33 and disposed at one corner of the block 30 adjacent an end of a channel, the fitting being similar to the fittings hereinbefore described, travels through a first channel 34 until it reaches the right sidewall 35 of the block. At this point a reflector plate 36 is mounted and is preferably made adjustable to correct for slight errors in milling. The reflector plate 36 causes the compressional wave to be reflected into a short channel 37 similar to the channel 34 and extending to the left at right angles therefrom. Adjacent the left end of the channel 37 a second reflector plate 40 is mounted in the upper end wall 41 of the tank 30. The reflector plate 40 reflects the compressional wave into a channel 42 extending at right angles to the channel 37 and parallel to the channel 34. A third reflector plate 43 is mounted in a left end wall 44 of the block 30 adjacent the end of the channel 42 and serves to reflect the compressional wave at right angles into a channel 45 extending at right angles to the channel 42 and parallel to the channel 37. A fourth reflector plate 46 is mounted in the lower end wall 47 of the block 30 adjacent the end of the channel 45 and serves to reflect the compressional wave into a channel 48 connected at right angles to this end of the channel 45.

In the same manner channels 50, 51, and 52 are formed in the block, being connected seriatim, and extending consecutively at right angles to each other. Reflector plates 53, 54, and 55, respectively, are mounted in the side walls of the block 30 so as to reflect a compressional wave from the channel 48 into the channel 50, then into the channel 51, and finally into channel 52. At the lower right corner of the block 30 as viewed in Fig. 4, and at the lower end of the channel 52 is mounted a second crystal 56, this crystal serving as a pick-up or receiving crystal and being suitably connected to a coaxial fitting 57. In use a suitable cover plate (not shown) would, of course, be employed to prevent loss of mercury.

When a compressional wave is produced in the transmitting medium 31 filling the several channels described by applying a signal to the transmitting crystal 32, the wave will travel through the several channels and eventually reach the pick-up crystal 56, inducing a charge thereon as a result of the piezoelectric effect. The signal induced on the receiving or pick-up crystal 56 will be delayed a period of time proportional to the time required for the compressional wave to travel through the transmitting medium 31. It has been found that the grid design shown in Fig. 4 provides essentially free space transmission and has the advantage over the type of delay line shown in Figs. 2 and 3 that the reliquirement that the channels be of a certain predetermined size with respect to the frequency to be transmitted in order to obtain fidelity is considerably less rigid. Dispersion of the compressional wave is held to a minimum and spurious modes eliminated at the junction points. Accordingly, the wave reaching the receiving crystal 56 is essentially of the same form as that applied from the transmitting crystal 32, that is to say, this delay line provides a high fidelity transmission.

While but two embodiments of the present invention have been shown and described, it will be understood that many changes and modifications may be made therein without departing from the spirit or scope of the present invention, which is limited only by the appended claims.

The invention shown and described herein may be manufactured and used by or for the Government of the United States of America for governmental purposes without the payment of any royalties thereon or therefor.

What is claimed is:

1. A delay line comprising a substantially rectangular container, a plurality of generally diagonal channels each of equal and uniform rectangular cross-section extending through said container and being consecutively connected at their ends at right angles to form a grid, a transmitting medium in said channels, a first electrical-mechanical means mounted in said container at one terminus of said grid, a second electrical-mechanical means mounted in said container at the other terminus of said grid, and reflector means at the connected end of said channels for reflecting a compressional wave produced by said first electrical-mechanical means to said second electrical-mechanical means along said channels.

2. A delay line comprising a substantially rectangular container, a plurality of generally diagonal channels each of equal and uniform rectangular cross section extending through said container and being consecutively connected at substantially right angles at their ends to form a grid of crisscrossed channels, a transmitting medium filling said channels, said channels forming a delay path, a first electrical-mechanical transducer means mounted in said container at one terminus of said delay path and operable in response to an applied electrical signal to produce a compressional wave in said transmitting medium, a second electrical-mechanical transducer means mounted in said container at the other terminus of said delay path and operable in response to an applied compressional wave to produce an electrical signal, and reflector means located at the connected ends of said channels for reflecting a compressional wave produced by said first electrical-mechanical transducer means along said delay path to said second electrical-mechanical transducer means.

3. A delay line comprising a container, a plurality of channels formed by said container consecutively connected at the ends of said channels at right angles to each other to form a grid having two terminuses, a transmitting medium filling said chambers to form a delay path between said terminuses, a first electrical mechanical means mounted at the one terminus of said grid, a second electrical mechanical means mounted in said container at the other terminus of said grid, reflector means at each of the connecting ends of said channels for reflecting a compressional wave produced by the first electrical mechanical means to said second electrical mechanical means along said channels.

4. A delay line comprising a substantially rectangular container, a plurality of diagonal intersecting channels extending through said container to form a grid of criss-crossed channels, said grid having two terminuses and said channels being connected at right angles at their ends, a liquid transmitting medium filling said channels to form a delay path between the two said terminuses, a first electrical mechanical transducer mounted in one terminus of said container and operable in response to an applied electrical signal to produce a compressional wave in said transmitting medium, a second electrical mechanical transducer mounted in said container at the other terminus of the grid and operable in response to an applied compressional wave from the first transducer to produce an electrical signal, and reflector means located at the connected ends of said channels for reflecting the compressional wave produced by said first electrical mechanical transducer along said delay path to said second electrical mechanical transducer.

References Cited in the file of this patent

UNITED STATES PATENTS

| | | |
|---|---|---|
| 2,155,659 | Jeffree | Apr. 25, 1939 |
| 2,263,902 | Percival | Nov. 25, 1941 |
| 2,421,026 | Hall et al. | May 27, 1947 |
| 2,427,348 | Bond et al. | Sept. 16, 1947 |
| 2,505,364 | McSkimin | Apr. 25, 1950 |